June 7, 1966     C. E. RUELLE     3,254,423
DRYER CONTROL CIRCUIT
Filed Dec. 4, 1961     2 Sheets-Sheet 1
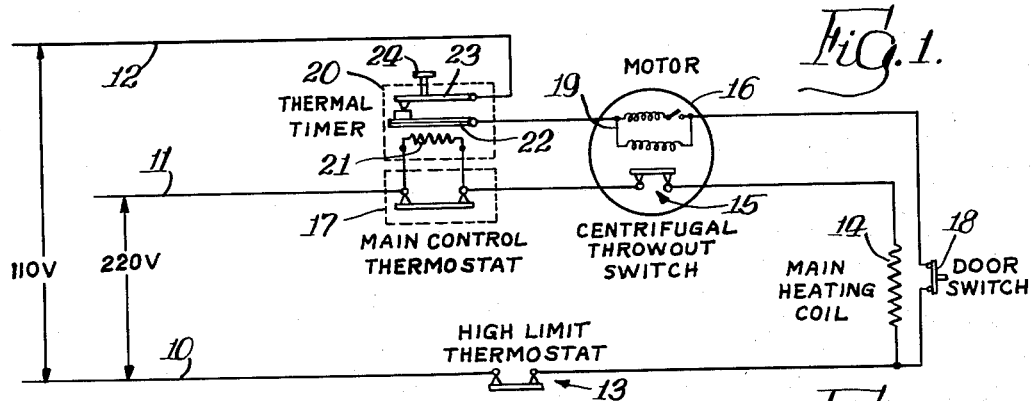
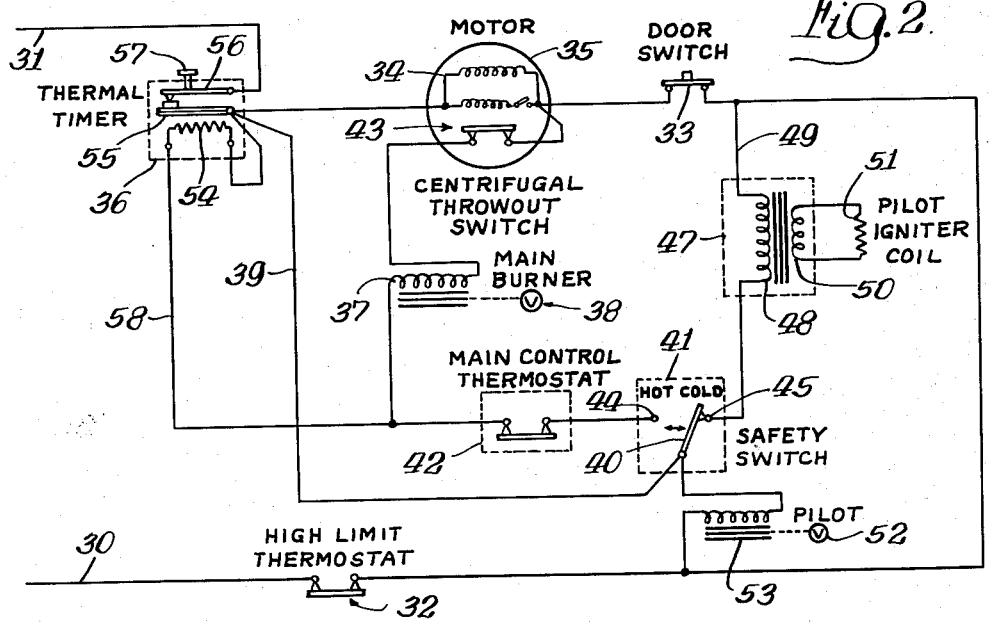
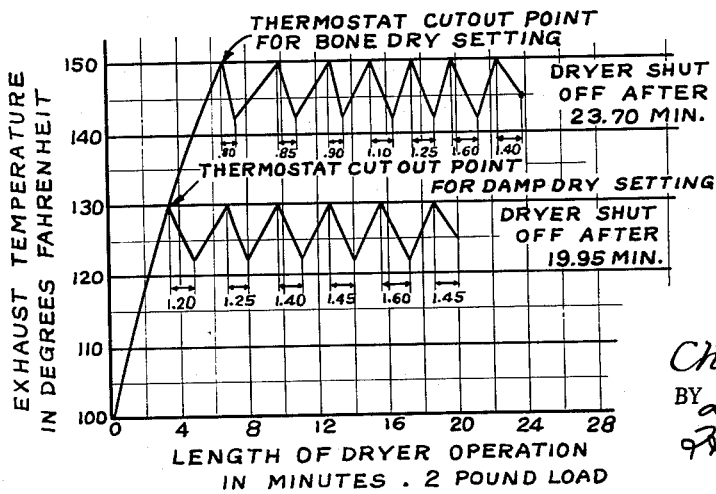
INVENTOR.
Charles E. Ruelle,
BY Davis, Lindsey,
Hibben & Noyes
Attys.

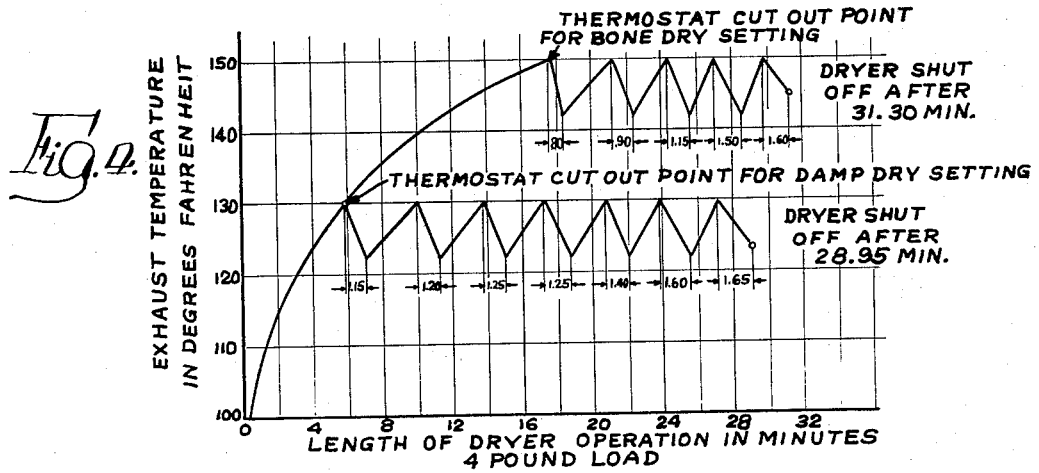
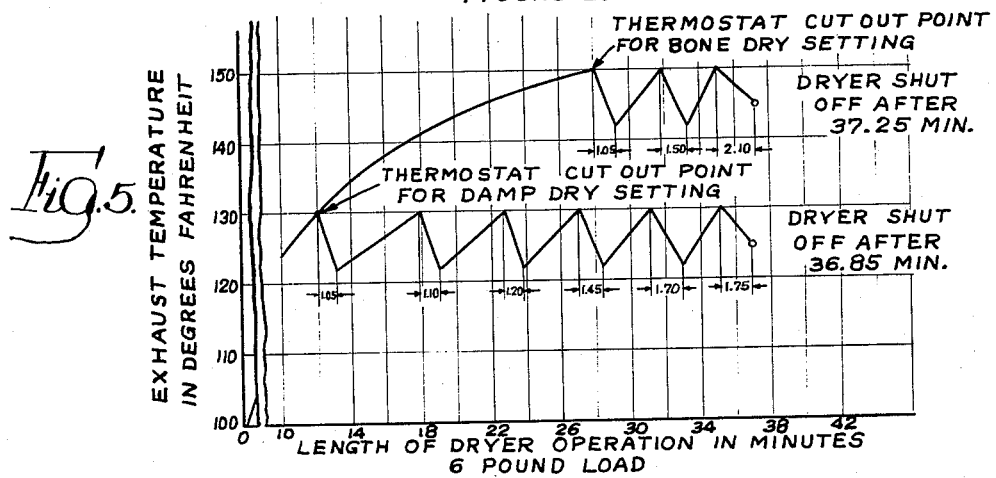
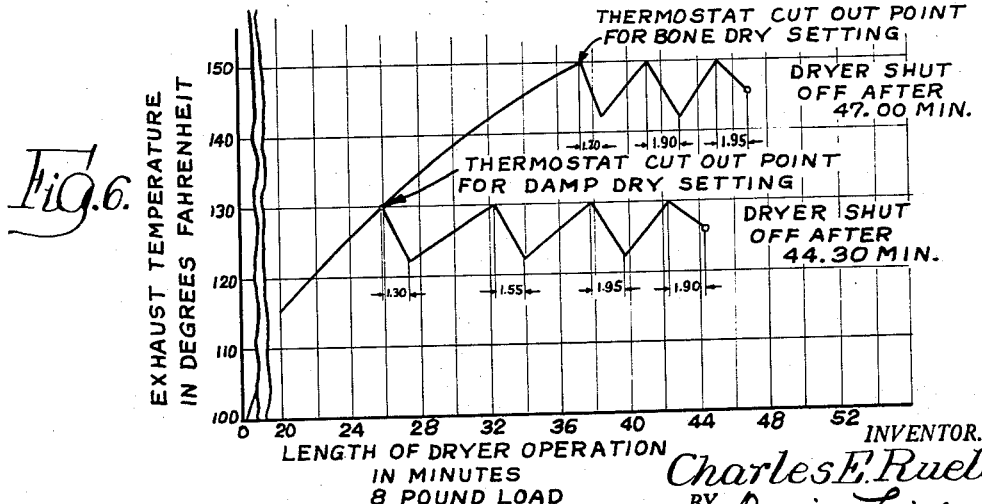

United States Patent Office 3,254,423
Patented June 7, 1966

1

3,254,423
DRYER CONTROL CIRCUIT
Charles E. Ruelle, Two Rivers, Wis., assignor to Hamilton Manufacturing Company, Two Rivers, Wis., a corporation of Wisconsin
Filed Dec. 4, 1961, Ser. No. 156,806
17 Claims. (Cl. 34—45)

This invention relates generally to automatic controls for appliances such as laundry dryers, and, more particularly, to a laundry dryer control system having means for automatically turning off a dryer when the laundry therein obtains a predetermined degree of dryness.

It has been proposed to equip dryers with a timer which the operator sets manually at the time the laundry is deposited in the dryer, the timer being operative to turn off the dryer after it has been in operation for a predetermined length of time. The length of time for which the timer is set is that which the operator feels to be suitable for the laundry load to be dried, and is merely the operator's guess as to a proper length of drying time, based on the operator's experience and skill in using the dryer. It has also been proposed to control a dryer by a thermostatic device which automatically shuts off the dryer when the drying chamber temperature or the exhaust air temperature reaches a predetermined point. With this type of control it is assumed that the temperature in the dryer will not reach this predetermined point until the laundry is substantially dry. However, it has been found that this is not always true unless the point at which the thermostatic device is set to operate is excessively high, in which case the laundry is often needlessly subjected to excessive temperatures. At lower settings of the thermostatic device, the turn-off temperature may be reached before the laundry is sufficiently dry.

It has also been suggested to provide a timer operation wherein the thermostat that shuts off the heating means of the dryer when the temperature reaches a predetermined high setting and turns on the heating means again at a predetermined low temperature value also actuates a timer. Such cycling of the thermostat occurs for a predetermined number of times, after which the timer completely shuts off the dryer.

All of these forms of control are subject to the objection that the dryer may be shut off before the laundry has reached the desired degree of dryness, or the dryer operation may continue beyond the point at which the desired degree of dryness has been reached. The first mentioned condition is undesirable because it defeats the fundamental purposes of the dryer which is to dry the laundry to the desired degree. The second mentioned condition is even more undesirable because over-drying results in a delay, a waste of heat causing unnecessary expense, and produces an excessive amount of lint.

Accordingly, it is the general object of this invention to provide a novel control system for an appliance such as a laundry dryer, which includes means for automatically turning off the dryer when the laundry has obtained a desired degree of dryness.

It is another object of the invention to provide a control system for a laundry dryer, which includes means for automatically turning off the dryer and preventing operation beyond the point at which the desired degree of dryness has been reached.

Still another object of the invention is to provide an automatic control system for a laundry dryer, which can be adjusted to shut off the dryer at any desired degree of dryness.

2

Still another object of the invention is to provide a novel control system for a laundry dryer, which includes manually operable means to shut off the dryer at any time during the drying cycle.

A still further object of the invention is to provide a novel control system for a laundry dryer, which may be applied to both gas and electric operated dryers.

Other objects and advantages of the invention will become apparent from the following detailed description taken in conjunction with the accompanying figures of the drawings, in which:

FIG. 1 is a schematic diagram of a control system for an electric laundry dryer, embodying the invention;

FIG. 2 is a schematic diagram of a control system for a gas operated laundry dryer, embodying the invention;

FIG. 3 is a graph illustrating the operation of a dryer control system handling a two pound load at both damp dry and bone dry settings;

FIG. 4 is a graph illustrating the operation of a dryer control system handling a four pound load at both damp dry and bone dry settings;

FIG. 5 is a graph illustrating the operation of a dryer control system handling a six pound load at both damp dry and bone dry settings; and FIG. 6 is a graph illustrating the operation of a dryer control system handling an eight pound load at both the damp dry and bone dry settings;

Generally, a control system embodying the invention is operable to control the operation of a laundry dryer of the type having a drying chamber in which a drum is rotatably mounted, a motor coupled to rotate the drum, and a main heating means which heats the chamber to dry the laundry deposited in the drum. The control system includes a main control temperature sensitive electrical switch, or thermostat, positioned to be responsive to the temperature of the air exhausted from the drying chamber and operable to turn on the main heating means at a predetermined low temperature limit and to turn off the main heating means at a predetermined high temperature limit. The temperature in the dryer cycles between these two limits as the thermostat and the main heating means cycle between on and off periods and the laundry approaches dryness.

It has been found that a definite relationship exists between the lengths of the on and off periods of the thermostat and the degree of dryness of the laundry. When the laundry is wet and cold, the on period of the thermostat and the main heating means is relatively long and the off period is relatively short because the exhaust air temperature rises slowly and drops rapidly. As the laundry becomes drier, the length of the on period gradually shortens and the length of the off period gradually lengthens. When the laundry is substantially bone dry, the on period during which the air is heated is relatively short and the off period during which it cools is relatively long.

This phenomenon is utilized by providing the control system with a thermal timer that is sensitive to the relative lengths of these on and off periods. This thermal timer comprises an electrical switch that is connected in the control system in such a manner as to turn off the dryer when it is open. The electrical switch is heat sensitive and is positioned to absorb heat generated by a heating coil, and it is constructed to open when it has absorbed a predetermined amount of heat. The heating coil is connected in the control system such that it is energized only during the off periods of the main control thermostat and the main heating means. Therefore, the thermal timer switch absorbs heat only during these off periods, and a portion of this heat is dissipated during the on periods.

At the beginning of a drying operation the heat in the thermal timer switch does not build up to the point of operation of the switch because the off periods of the dryer when the switch is absorbing heat from its coil are short and the on periods when the switch is dissipating heat are long. As the laundry becomes drier, however, the thermal timer switch absorbs a greater amount of heat because of the longer period of operation of its heating coil and retains a greater amount of such heat until, when the laundry has obtained the desired degree of dryness, the heat added by the heating coil and the residual heat in the thermal timer switch is high enough to cause it to open and turn off the dryer. Since the relative lengths of the on and off periods are substantially proportional to the dryness of the laundry and the length of time required for the thermal timer switch to open depends on the relative lengths of the on and off periods and the number of times the thermostat has cycled, it is evident that the time required for the thermal timer switch to open and turn off the dryer is substantially proportional to the degree of dryness of the laundry.

The control system can be applied to both electric and gas operated dryers, and controls the operation of both the main heating means and the motor that drives the drum. The thermal timer is preferably equipped with a manual reset button that may be used to start a drying operation or stop it at any time. The control system also includes various safety devices such as a door switch, high limit thermostat, and, in the case of a gas operated dryer, means to prevent operation unless a pilot is on.

In greater detail, FIG. 1 illustrates an electric laundry dryer control system embodying the invention. It includes three power input lines 10, 11 and 12, the lines 10 and 11 having a potential of, for example, 220 volts across them and the lines 10 and 12 having, for example, a potential of 110 volts across them. Connected between the lines 10 and 11 are a high limit thermostat 13 that is positioned to be responsive to the temperature within the drying chamber (not illustrated) of a laundry dryer or the exhaust air temperature, a main heating circuit including at least one main electrical heating coil 14, a speed responsive switch such as a centrifugal throwout switch 15 coupled to the rotor of a motor 16 in a manner to be described hereinafter, and a main control thermostat 17 positioned to be responsive to the temperature of the air exhausted from the drying chamber. The motor 16 drives the drum containing the laundry, as heretofore mentioned, and also drives a means for circulating air through the drying chamber.

Connected across the low power lines 10 and 12 and through the high limit thermostat 13 are a door switch 18, the windings 19 of the electric motor 16 and a switch in a thermal timer 20. This thermal timer 20 comprises a heating coil 21 that is connected in parallel with the main control thermostat 17, and a timer switch that comprises a bimetallic element 22 positioned adjacent the heating coil 21 and a pivotally mounted switch arm 23 that has an on position and an off position. The bimetallic element 22 and the arm 23 comprise essentially a single-pole single-throw switch having a manual reset button 24. To close the timer switch the reset button 24 is pushed, which moves the arm 23 to the on position where it contacts the bimetallic element 22. The timer switch may be opened either by manually pulling out the button 24 which causes the arm 23 to move over-center to the off position where it no longer contacts the bimetallic element 22, or by heating the bimetallic element 22 to the point where it forces the arm 23 over-center to the off position. The reset button 24 must be pressed to move the arm 23 to the on position and close the timer switch.

The high limit thermostat 13 is preferably a single-pole single-throw bimetallic disk type that is adjusted to open at a higher temperature than the highest possible temperature setting of the main control thermostat 17. It acts as a safety control to prevent abnormally high temperatures in the event the control thermostat 17 fails. The door switch 18 is positioned to be automatically closed when the dryer door is closed and open when the door is opened. The centrifugal switch 15 is coupled to the rotor of the motor and is open below a predetermined motor speed and closed above this speed. The main heating coil 14 serves as a heat source for drying the laundry. The main control thermostat 17 is preferably a single-pole single-throw adjustable type that closes at a low temperature limit and opens at a high temperature limit. The temperatures at which this control thermostat opens and closes may be varied to obtain varying degrees of dryness of the laundry, as will be described hereinafter.

In operation, the power input lines 10, 11 and 12 are connected to suitable electric power outlets and a load of laundry to be dried is placed in the drum of the dryer. The high limit thermostat 13 and the main control thermostat 17 are both closed at this time because the temperature within the drying chamber is relatively low. As soon as the door of the dryer is closed and the push button 24 is pressed to close the timer switch, current flows through the low power lines 10 and 12, the thermal timer 20, and the windings 19 of the motor 16 and the latter starts up. When the speed of the motor 16 reaches a predetermined value, such as its rated speed, the centrifugal switch 15 closes and completes the circuit between the high power lines 10 and 11 and current flows through the main heating coil 14 and the main control thermostat 17.

FIG. 3 illustrates the operation of one example of a dryer charged with a two pound load of laundry. Assuming that the main control thermostat 17 has been set for bone dry operation, constant energization of the heating coil 14 causes the temperature of the air exhausted from the drying chamber to rise to a value of approximately 150° F. in approximately 6½ minutes. The main control thermostat 17 is preset to open at this temperature and, consequently, the heating coil 14 is deenergized. The motor 16, however, continues to rotate and the throwout switch 15 remains closed. With the main control thermostat 17 open and the heating coil 14 deenergized, the temperature within the drying chamber falls relatively rapidly, and, after an off time period of approximately 0.8 minute, the temperature has fallen to about 142° F. and the main control thermostat 17 once again closes and energizes the heating coil 14. The heating coil 14 is then energized for an on time period of approximately 2½ minutes. The control thermostat 17 and the heating coil 14 subsequently continue to cycle through these on and off periods. It will be noted that, for the reasons previously mentioned, the on time periods become successively shorter and the off time periods become successively longer as the laundry becomes drier.

Since the heating coil 21 of the thermal timer 20 is connected in parallel with the main control thermostat 17, it is shorted out when the main control thermostat 17 is closed, during the on periods, and it is energized when this thermostat is open, during the off periods. Current flowing through the thermal timer heating coil 21 when it is energized also flows through the main heating coil 14, but the resistance of the timer heating coil 21 is very much greater than the resistance of the main heating coil 14 so that current flow is relatively small, and the main heating coil 14 is, in effect, deenergized because the heating effect produced by the current flowing through it is negligible. However, heat is produced by the coil 21 in the thermal timer 20 which is absorbed by the bimetallic element 22 during the off periods. During the on periods a portion of the absorbed heat is dissipated by the thermal timer bimetallic element 22. It is evident that, as the laundry becomes drier, the bimetallic element 22 absorbs and retains a greater quantity of heat because the on periods grow shorter and the off periods grow longer. This thermal timer switch is adjusted so that the bimetallic element 22 will warp due to the heat generated by the coil 21 and force the pivotally mounted switch arm 23 over-center to the off position when the laundry in the drying chamber has reached the desired bone dry condition, which occurs when the on period is relatively short and the off period is relatively long.

When the bimetallic element 22 and the switch arm 23 have broken contact, current flow through the windings 19 of the motor 16 stops and the rotation of the motor 16 slows down, causing the centrifugal throwout switch 15, and the circuit through the main heating coil 14 to open. Thereafter, operation of the dryer can be resumed only by pressing the manual reset button 24 which puts the arm 23 again in contact with the bimetallic element 22.

Operation of the dryer may also be stopped either by opening the door of the dryer which causes the door switch 18 to open, the motor 16 to slow down and the throwout switch 15 to open, or if the temperature within the dryer reaches a danger point where the high limit thermostat 13 opens, which also opens both the heating coil 14 circuit and the motor 16 circuit.

The foregoing discussion has assumed that the main control thermostat 17 is set for bone dry operation. If it is set for damp dry operation, the dryer operation is essentially the same except that the thermostat 17 is adjusted to open the heating coil 14 circuit at a temperature of approximately 130° F. and close it at approximately 122° F. Also, the off time required for the temperature within the drying chamber to drop is greater, and the on time required for the temperature within the drying chamber to rise is less for each cycle. This is true because the temperature within the drying chamber is closer to the ambient room temperature and hence it takes a greater length of time for the temperature to fall to the lower limit. Consequently, the bimetallic element 22 in the thermal timer 20 reaches a higher temperature at each cycling of thermostat 17 than is the case with the bone dry setting of the main control thermostat because of the increased length of time the heating coil 21 is operating during the off periods and the decreased dissipation of heat during the on periods.

With reference to FIGS. 4, 5, and 6 which illustrate the operation of a dryer with 4, 6 and 8 pound laundry loads, respectively, it is evident that one effect of putting a larger load into the drying chamber is to increase the length of time required for the temperature to first reach the high temperature cutout point of the main control thermostat 17. This, of course, is due to the fact that it takes longer to heat up a larger load. Another effect of increased loads is to correspondingly increase the lengths of the on periods. For each type of load, the dryer operates until the off periods are long enough to cause the thermal timer switch to open.

FIG. 2 illustrates a control system embodying the invention for a gas operated laundry dryer. It comprises two power input lines 30 and 31 which are connected to energize both a motor circuit and a main heating circuit. The current path to the motor circuit includes a high limit thermostat 32, a door switch 33, the windings 34 of an electric motor 35 and a switch in a thermal timer 36. The current path to the main heating circuit includes the switch in the thermal timer 36, a conductor 39 that leads to a movable contact 40 of a safety switch 41, a stationary contact 44 of the safety switch 41, a main control thermostat 42, a main burner solenoid 37, a centrifugal throwout switch 43 coupled to the rotor of the motor 35, the door switch 33 and the high limit thermostat 32. The solenoid 37 is coupled to operate a gas valve 38 that controls the flow of gas to the main heating burner of the dryer.

The safety switch 41 is preferably a single-pole double-throw mercury pressure actuated switch which will not allow the main gas burner to operate until a pilot gas burner has been lighted. This switch 41 has, in addition to the movable contact 40, a hot position contact which is the stationary contact 44 and which is connected to the main control thermostat 42, and a stationary cold position contact 45 which is connected to an igniter circuit. This igniter circuit comprises a step down transformer 47 that has its primary winding 48 connected between a conductor 49 that leads to the power input line 30 through the thermostat 32, and the cold position contact 45 of the safety switch 41. The secondary winding 50 of the transformer 47 is connected across a pilot igniter glow coil 51.

The system also includes a pilot solenoid 53 that is connected to the power input line 30 through the thermostat 32 and to the power input line 31 through the thermal timer 36 switch and the conductor 39. The solenoid 53 is coupled to operate a gas valve 52 which controls the flow of gas to a pilot burner. The pilot igniter coil 51 is positioned to ignite gas issuing from the pilot burner which in turn is positioned to ignite gas issuing from the main burner.

The main control thermostat 42, the thermal timer 36, the motor 35 and throwout switch 43, the door switch 33, and the high limit thermostat 32 may all be identical to the corresponding components illustrated in FIG. 1. The thermal timer 36 again includes a heating coil 54 connected between the conductor 39 and a conductor 58 that leads to one side of the main control thermostat 42, a bimetallic element 55 positioned adjacent the heating coil 54, a two-position switch arm 56 which is movable between on and off positions, and a manual reset button 57 connected to the switch arm 56. The safety switch 41, which is in the cold position when the dryer is started, includes a mercury filled bulb positioned to be heated by the pilot flame. This bulb, when heated sufficiently by the pilot flame, causes the movable contact 40 to shift from the cold position contact 45 to the hot position contact 44.

To begin dryer operation after a load of laundry has been placed in the drying chamber and the door closed, the reset button 57 is pushed, which closes the thermal timer switch connection between the bimetallic element 55 and the switch arm 56. Since the high limit thermostat 32 is normally closed, the circuit through the windings 34 of the motor 35 is completed and the motor begins to rotate. In addition, current flows through the circuit including the high limit thermostat 32, the pilot solenoid 53, the conductor 39 and the thermal timer 36, and through the circuit including the high limit thermostat 32, the conductor 49, the transformer 47, windings 48 and 50, the safety switch 41 which is at the cold position contact 45, the conductor 39, and the thermal timer 36. The energized pilot solenoid 53 opens the pilot valve 53 and the pilot flame is ignited by the energized pilot igniter coil 51. Heat from the pilot flame then causes the contact 40 of the safety switch 41 to move to the hot position contact 44. Also, the centrifugal throwout switch 43 closes as soon as the motor 35 reaches approximately its rated speed.

Current then flows through the high limit thermostat 32, the door switch 33, the throwout switch 43, the main burner solenoid 37, the main control thermostat 42 which is initially closed due to the low temperature of the laundry in the drying chamber, the safety switch 41, the conductor 39, and the thermal timer 36. The energized main burner solenoid 37 opens the main burner valve 38, and the gas issuing therefrom is ignited by the pilot flame. It will be noted that during this on period of the control thermostat 42 and the main burner no current flows through the heating coil 54 of the thermal timer 36 because it is connected in parallel with the control thermostat 42 and the safety switch 41, and is shorted out when the control thermostat 42 is closed.

As soon as the temperature of the air exhausted from the drying chamber rises to the upper cut out point of the control thermostat 42, it opens. Current then flows from the line 30, through the throwout switch 43, the main burner solenoid 37, the conductor 58, the heating coil 54 of the thermal timer 36, the bimetallic element 55 and the arm 56, to the line 31. The resistance of the coil 54 of the timer 36 is much higher than the resistance of the solenoid 37 so that the rate of current flow is small and not enough to energize the main burner solenoid 37. However, the current flow is large enough to cause the coil 54 to heat the bimetallic element 55 in the thermal timer 36. Thereafter, the operation of this gas operated dryer control circuit is essentially the same as the operation of the electric dryer control circuit shown in FIG. 1. The main control thermostat 42 continues to cycle between upper and lower temperature limits; during its on period sufficient current flows through the solenoid 37 to open the main burner valve 38 and during its off period sufficient current flows through the coil 54 of the thermal timer 36 to heat the bimetallic element 55. The length of time required for the heat supplied by the coil 54 plus the residual heat in the bimetallic element 55 to force the arm 56 over center to the off position is again set to coincide with the time required for the laundry in the drying chamber to reach the desired degree of dryness. Since both the motor circuit and the main heating circuit are connected to the power input line 31 through the thermal timer 36, they will be turned off simultaneously when the thermal timer 36 switch opens. In addition, upon opening of the timer 36 switch, the circuit through the pilot solenoid 53 is interrupted and the safety switch 41 reverts to the cold position.

Operation of the dryer can also be stopped at any point during a drying operation by either pulling the reset button 57 of the thermal timer 36 or by opening the door of the dryer which opens the switch 33. In the former instance all of the components in the dryer are turned off, while in the latter instance the pilot light stays on.

The graphs for the dryer circuit shown in FIG. 2 will be similar to the graphs shown in FIGS. 3 to 7.

From the foregoing description, it is evident that a novel and useful control system for an appliance such as a laundry dryer has been provided. The control system may be applied to either electric or gas operated dryers and it can be adjusted to obtain a desired degree of dryness in the laundry. The control system causes the dryer to continue operating until the laundry has obtained the desired degree of dryness and it prevents operation of the dryer beyond this point. In both embodiments illustrated, the dryer may be manually shut off at any point during the drying operation and both embodiments include suitable safety devices.

I claim:

1. A control system for a laundry dryer having a drying chamber, comprising main heating means for the drying chamber, a main heating electrical circuit for controlling said main heating means, first electrical switch means responsive to the temperature within the drying chamber and operative to deenergize said main heating circuit when the temperature within the drying chamber rises to a predetermined upper limit and to energize said main heating circuit when the temperature within the drying chamber falls to a predetermined lower limit, second temperature sensitive electrical switch means operative to open said main heating circuit when it is heated above a predetermined temperature, and a secondary heating means positioned to heat said second switch means and connected to be responsive to the position of said first electrical switch means in such a manner that current flows through said secondary heating means only when said main heating circuit is deenergized by said first switch means, said second switch means thereby absorbing and accumulating heat when said main heating circuit is deenergized and dissipating heat when said main heating circuit is energized.

2. A control system as in claim 1 wherein said second electrical switch means includes a bimetallic element positioned adjacent said secondary heating means, and a two position switch arm positioned to make contact with said bimetallic element in one of its two positions.

3. A control system as in claim 1 wherein said first switch means is connected in series with said main heating circuit and said secondary heating means is connected in parallel with said first switch means.

4. A control system as in claim 3, said system further including a motor, the windings of said motor being connected to be energized through said second switch means, and third electrical switch means responsive to the speed of said motor, said third electrical switch means being connected in series with said main heating circuit and being adapted to close when the speed of said motor rises to a predetermined value and open when the speed of said motor falls below said predetermined value.

5. A control system for an electric laundry dryer having a drying chamber and a rotatably mounted drum in said chamber, comprising a main electrical heating coil positioned to heat the drying chamber, a main heating circuit having said main heating coil connected therein, first electrical switch means responsive to the temperature of the air within the drying chamber and electrically connected to deenergize said main heating circuit when the temperature of the air within the drying chamber rises to a predetermined upper limit and to energize said main heating circuit when the temperature of the air within the drying chamber falls to a predetermined lower limit, a motor circuit including an electric motor coupled to rotate said drum, second temperature sensitive electrical switch means adapted to absorb and accumulate heat and connected to open said motor circuit and said main heating circuit when it is heated to a predetermined temperature, and a secondary heating coil positioned to heat said second switch means and responsive to the position of said first switch means in such a manner that current flows through said secondary heating coil only when said main heating circuit is deenergized by said first switch means.

6. A control system as in claim 5, wherein said main heating circuit is connected in series with said first switch means and said secondary heating coil is connected in parallel with said first switch means.

7. A control system as in claim 5, wherein said second switch means comprises a bimetallic element positioned to absorb heat generated by said secondary heating coil, and a two position switch arm positioned to be connected to said bimetallic element in one of its two positions, said switch arm being manually adjustable from one position to the other.

8. A control system for a gas operated laundry dryer having a drying chamber, comprising a main heating circuit, a main solenoid coupled to control the operation of a main gas burner and connected in said main heating circuit, first electrical switch means responsive to the temperature of the air within the drying chamber and operable to deenergize said main heating circuit when the temperature of the air within the drying chamber rises to a predetermined upper limit and to energize said main heating circuit when the temperature of the air within the drying chamber falls to a predetermined lower limit, second temperature sensitive electrical switch means adapted to absorb and accumulate heat connected to open said main heating circuit when it is heated to a predetermined temperature, and a heating coil positioned to heat said second switch means and responsive to the position of said first electrical switch means in such a manner that current flows through said heating coil only when said main heating circuit is deenergized by said first switch means.

9. A control system as in claim 8, wherein said first switch means is connected in series with said main heating circuit and said heating coil is connected in parallel with said first switch means.

10. A control system as in claim 9, for a gas laundry dryer having a rotatable drum in said drying chamber including a motor circuit, an electric motor coupled to rotate said drum and connected in said motor circuit, a speed responsive switch coupled to said motor and connected in series with said main heating circuit and being adapted to close when the speed of said motor rises to a predetermined value and to open when the speed of said motor falls below said predetermined value, said second switch means also being connected to deenergize said motor circuit when it is heated by said heating coil to said predetermined temperature.

11. A control system as in claim 10, and further including a pilot circuit connected to be energized through said second switch means, a pilot solenoid adapted to control the operation of a gas pilot, said pilot solenoid being connected in said pilot circuit, a pilot igniter coil connected in an igniter circuit, a temperature sensitive safety switch having a movable contact connected to said second switch, a hot position contact and a cold position contact, said safety switch being responsive to the heat produced by the pilot in such a manner that said movable contact is at said hot position contact when said pilot is on and at said cold position contact when said pilot is off, said hot position contact being connected to said main heating circuit and said cold position contact being connected to said igniter circuit, so that said igniter circuit is connected to said second switch means when the pilot is off and said main heating circuit is connected to said second switch means when the pilot is on.

12. A control for a laundry dryer or the like having a drying chamber, a heater and a heater circuit therefor, said control comprising a thermostat responsive to the temperature in the drying chamber for opening the heater circuit when the temperature in the drying chamber reaches a predetermined upper limit and for reclosing the heater circuit when the temperature in the drying chamber falls to a predetermined lower limit, the periods of time said heater circuit is held open by said thermostat increasing with the decrease of moisture content of the laundry, and timing means responsive to the relative lengths of both the open and closed periods of the heater circuit for opening said heater circuit when laundry within the drying chamber reaches a predetermined degree of dryness.

13. A control for a laundry dryer or the like having a drying chamber, a drive motor and a motor circuit therefor, and a heater and a heater circuit therefor, said control comprising a thermostat responsive to the temperature in the drying chamber for opening the heater circuit when the temperature in the drying chamber reaches a predetermined upper limit and for reclosing the heater circuit when the temperature in the drying chamber falls to a predetermined lower limit, the period of time said heater circuit is held open by said thermostat increasing with the decrease of moisture content of the laundry, and timing means operable after a period of operation to open said motor circuit, said timing means being connected to initiate said period of operation each time that a said thermostat opens said heater circuit and being gradually retrogressive toward its initial condition each time that said thermostat recloses said heater circuit, said timing means thereby being responsive to the relative lengths of both the open and closed periods of the heater circuit and being operable to open said motor circuit when said period that said heater circuit is open exceeds said period of operation of said timing means.

14. A control according to claim 13, in which said timing means comprises a heat responsive switch controlling said motor circuit, and heating means connected to be energized to heat said switch each time that said heater circuit is opened and being deenergized to permit said switch to cool and thus retrogress toward its initial condition each time that said heater circuit is closed.

15. A control for a laundry dryer or the like having a drying chamber, a drive motor and a motor circuit therefor, and a heater and a heater circuit therefor, said control comprising a thermostat responsive to the temperature in the drying chamber for opening the heater circuit when the temperature in the drying chamber reaches a predetermined upper limit and for reclosing the heater circuit when the temperature in the drying chamber falls to a predetermined lower limit, the period of time said heater circuit is held open by said thermostat increasing with the decrease of moisture content of the laundry, a heat responsive switch controlling said motor circuit and operable when heated to a predetermined extent to open said motor circuit, and heating means for said switch connected to be energized each time that said heater circuit is opened to supply heat to said switch and to be deenergized each time that said heater circuit is closed to permit said switch to cool, said switch opening said motor circuit when the residual heat therein plus the heat supplied by said heating means is sufficient to heat said switch to said predetermined extent within a period of time in which said heater circuit is held open, whereby said switch is responsive to the relative lengths of both the open and closed periods of the heater circuit.

16. A control for a laundry dryer or the like having a drying chamber, a drive motor and a motor circuit therefor, and a heater and a heater circuit therefor, said control comprising a thermostat responsive to the temperature in the drying chamber for opening the heater circuit when the temperature in the drying chamber reaches a predetermined upper limit and for reclosing the heater circuit when the temperature in the drying chamber falls to a predetermined lower limit, said heater circuit thereby having "off" periods and "on" periods with the "off" periods increasing in length of time with the decrease of moisture content of the laundry, a heat responsive switch controlling the motor circuit, and heating means for said switch operable to supply heat to said switch during said "off" periods and to permit said switch to cool during said "on" periods, said switch accumulating heat during "off" periods and opening said motor circuit when an "off" period is of sufficient duration for said switch to be heated to a predetermined extent by residual heat therein and by operation of said heating means, whereby said switch is responsive to the relative lengths of both the "on" periods and the "off" periods.

17. A control for a laundry dryer or the like having a drying chamber, a drive motor and a motor circuit therefor, and a heater and a heater circuit therefor, said control comprising a thermostat responsive to the temperature in the drying chamber for opening the heater circuit when the temperature in the drying chamber reaches a predetermined upper limit and for reclosing the heater circuit when the temperature in the drying chamber falls to a predetermined lower limit, the period of time said heater circuit is held open by said thermostat increasing with the decrease of moisture content of the laundry, and timing means comprising a heat responsive switch controlling said motor circuit and heating means operable to heat said switch and effect opening thereof to open said motor circuit after a period of operation of said heating means, said period of operation decreasing in length of time in successive periods of operation due to residual heat in said switch, said heating means being energized only during the periods when said heater circuit is held open, said heating means thereby opening said motor circuit when said period of operation of said heating means is less than the period that said heater circuit is held open, whereby said timing means is responsive to the relative lengths of both the open and closed periods of the heater circuits.

(References on following page)

References Cited by the Examiner

UNITED STATES PATENTS

| | | | |
|---|---|---|---|
| 2,878,580 | 3/1959 | Hughes | 34—45 |
| 3,021,605 | 2/1962 | Anderson | 34—45 |
| 3,028,680 | 4/1962 | Conlee | 34—45 |
| 3,045,993 | 7/1962 | Sidaris | 34—45 |
| 3,109,717 | 11/1963 | Clapp | 34—45 |

FOREIGN PATENTS 225,397   4/1959   Australia.

WILLIAM F. O'DEA, *Primary Examiner.*

NORMAN YUDKOFF, *Examiner.*

J. J. CAMBY, *Assistant Examiner.*